June 29, 1965 A. ABOLINS 3,192,377
HARNESS FOR TRAILER CLEARANCE LIGHTS
Filed Feb. 18, 1963 2 Sheets-Sheet 1
FIG. 1
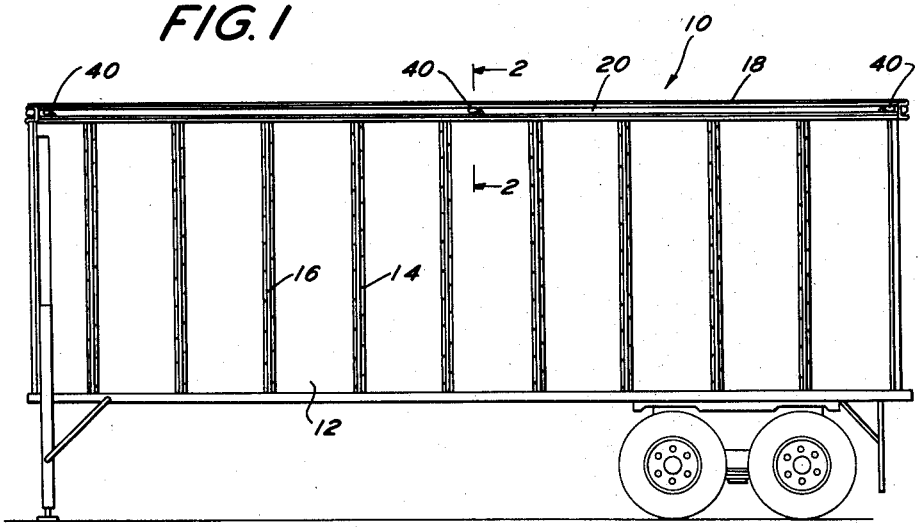
FIG. 4
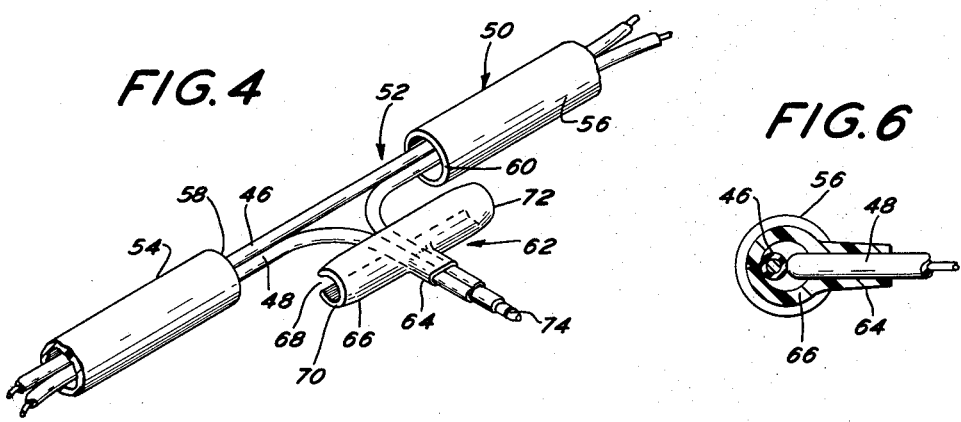
FIG. 6
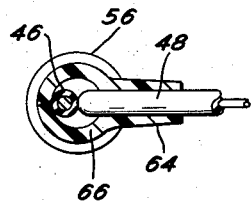
FIG. 5
FIG. 7
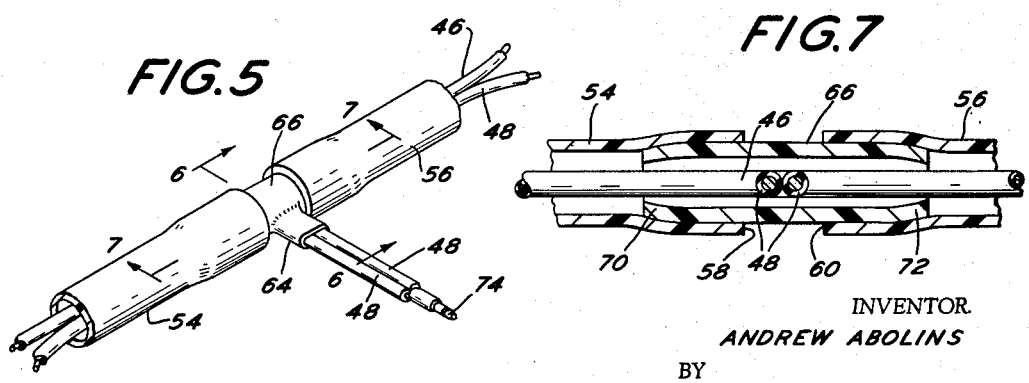
INVENTOR.
ANDREW ABOLINS
BY
ATTORNEYS June 29, 1965  A. ABOLINS  3,192,377
HARNESS FOR TRAILER CLEARANCE LIGHTS
Filed Feb. 18, 1963  2 Sheets-Sheet 2

INVENTOR.
ANDREW ABOLINS
BY
Millman and Jacobs
ATTORNEYS

United States Patent Office 3,192,377
Patented June 29, 1965

---

3,192,377
HARNESS FOR TRAILER CLEARANCE LIGHTS
Andrew Abolins, Penndel, Pa., assignor to Strick Trailers, a division of Fruehauf Trailer Co., Philadelphia, Pa., a corporation of Michigan
Filed Feb. 18, 1963, Ser. No. 259,314
8 Claims. (Cl. 240—8.2)

This invention relates to light harnesses in general and more particularly to harnesses for use with trailer clearance lights.

For safety reasons trailer bodies are required to be equipped with clearance lights towards the top thereof along the sides, front and rear. One type of trailer body in widespread commercial use employs top rails along the sides to support a roof and engage the side panels and posts, each of which top rails is formed with an outwardly opening longitudinal channel and a longitudinal groove opening upwardly into the channel. The lights are mounted in or below the channel and are operatively connected to one of a pair of insulated wires retained in a conduit which is in turn held in the top rail groove.

Heretofore this installation was effected by cutting off lengths of insulation of one of the two wires at desired locations, attaching branch wires thereto by crimp connectors, pulling the wires through a length of outer conduit which is provided with a plurality of holes, fishing out the branch wires through the holes by a hook, pushing the conduit into the top rail groove and then connecting the branch wires to the lights. There are several disadvantages in this method of installation. For one the procedure is difficult and time consuming. For another, the connectors cut into the wire insulation and outer conduit to produce shorts. For still another, the branches or "pigtails" are unprotected as they pass through the holes in the top rail for below-rail light mounting.

It is the primary object of this invention to provide a harness for trailer clearance lights which overcomes the aforementioned disadvantages by eliminating the need for pulling all the wires through the full length of the conduit and for fishing out the branch wires through holes, by eliminating the need for using connectors at the branch locations, by eliminating the need for cutting the branch wire itself and by eliminating the need for hammering the harness into the top rail groove, a common source of installation damage to the conduit.

Another object of the invention is to provide a trailer clearance light harness which effectively waterproofs the critical points of connection of the branch lines to the conduit lines.

Another object of the invention is to provide a trailer clearance light harness which is readily adapted for use with lights mounted in or below the top rail while minimizing possibility of shorts which commonly occur in the latter type of installation.

The flexible plastics now used for electrical insulating harnesses possess the property of cold flow under load. Hence when the same is pinched but not necessarily cut by metallic members, frequently a delayed action type of short occurs. It is an important object of this invention to provide a harness which removes any possible occurrence of this delayed action type of short by eliminating pinching of the plastic by metallic members.

Yet another object of the invention is to provide a trailer clearance light harness with a self-adjusting length feature allowing contraction and expansion of the conduit in between the lights without pulling on the wires.

These and other objects of the invention will become more apparent as the following description proceeds in conjunction with the accompanying drawings, wherein:

FIG. 1 is a side elevational view of a trailer body incorporating the invention;

FIG. 4 is a group perspective view of the harness in about-to-assemble form;

FIG. 5 is a view similar to FIG. 4 showing the harness in assembled form;

FIG. 6 is a sectional view taken on the line 6—6 of FIG. 5; and

FIG. 7 is a sectional view taken on the line 7—7 of FIG. 5.

Figure 2:
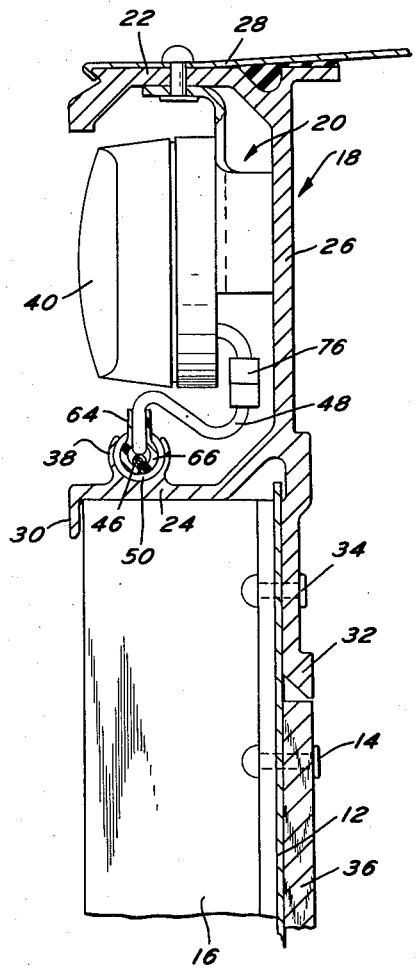
FIG. 2 is an enlarged sectional view taken on the line 2—2 of FIG. 1.

Specific reference is now made to the drawings in which similar reference characters are used for corresponding elements throughout. A conventional trailer body is shown at 10 and comprises among other things side sheets or panels 12 secured as by rivets 14 between spaced vertical posts 16 and longitudinal top rails 18 forming the upper side edges of the body. Each top rail includes an outwardly opening channel 20 consisting of upper and lower horizontal flanges 22 and 24 connected by a vertical web 26. The roof 28 is secured on the upper flange 22 whereas the lower horizontal flange 24 is provided with an outer depending lip or flange 30 which is spaced by a distance equivalent to the thickness of the posts 16 and sheets 12 from an inner flange 32 which depends from the web 26. The posts 16 and sheets 12 are disposed between the lip 30 and the flange 32 and are secured to the latter by appropriate means such as rivets 34. The lower edge of the flange 32 confines the upper edges of inner liners 36 which are secured to the posts and side sheets by the rivets 14.

Figure 3:
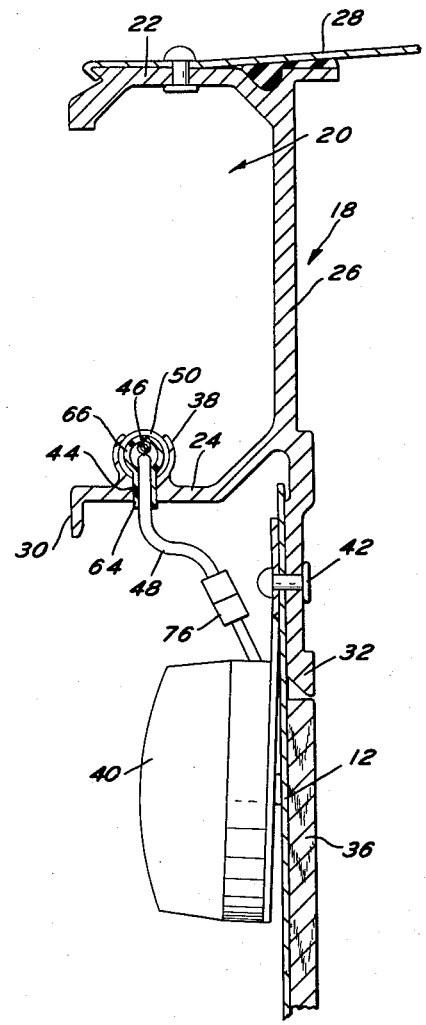
FIG. 3 is a view similar to FIG. 2 of a modified form of the invention.

Formed with the top rail in the lower flange 24 is a longitudinal groove 38 which opens upwardly into the channel 20. The clearance lights 40 may be mounted in the top rail channel 20, as seen in FIG. 2, or below the top rail channel to the flange 32 and sheet 12 as at 42 as seen in FIG. 3, in which latter case the lower flange 24 is provided with vertical thorough holes 44 drilled therein which communicate with the groove 38 for a purpose later to appear.

A pair of insulated wires 46 and 48 are provided which are to be retained as a unit in the top rail groove 38 and one wire 48 of which is to be branched and connected to the lights 40 at various locations by the harness of the instant invention. The wires 46 and 48 are disposed in a cylindrical conduit 50 of diameter approximating that of the top rail groove 38 which is made of a flexible insulating plastic such as polyethylene, polypropylene, nylon, etc. The conduit is discontinued for predetermined lengths as at 52 at the locations where branches to the lights are to be effected. Thus at each of these locations, the conduit 50 includes two portions 54 and 56 having spaced confronting openings 58 and 60.

A substantially T-shaped branching member 62 is provided which is also made of a flexible insulating plastic such as those previously mentioned. The member 62 includes a tubular leg 64 which is integral with a cross arm 66 of predetermined length, the cross arm being split along its length as at 68 so as to provide, in effect, a flexible open collar. The ends 70 and 72 of the cross arm 66 are tapered or reduced in diameter.

In use, one of the wires 48 at each light location is looped and extended as a double wire unit through the leg 64 of the member 62 and the cross arm 66 is buttoned or wrapped around the wire 46 and the remaining portions of the wire 48 at the discontinued area 52 of the conduit 50. Then the ends 70 and 72 are pushed into conduit portions 54 and 56 through the confronting open ends 58 and 60 thereof, the tapering of the ends 70 and 72 serving to guide them through the ends 58 and 60 and to limit the bulging of the conduit portions 54 and 56 thereat.

The conduit portions 54 and 56 by embracing the cross arm 66 at its ends closes the split portion 68 and keeps it closed so as to provide a water tight seal while permitting contraction and expansion of the conduit between the T-members without pulling on the wires. In addition, combining the slit 68 with the insertion of the ends of the cross arm into the conduit acts to maintain fitting of the conduit in the uniform diameter of the top rail groove 38.

Thereafter, a quick connect male coupling 74 is electrically attached to the wire 48 at its loop, the coupling being adapted for quick connection to a female coupling associated with the light as at 76. Should the coupling 74 be assembled on the wire 48 before the cross arm is buttoned over the wires, the use of a coupling 74 of diameter larger than that of the tubular leg 64 will serve as a stop to keep member 62 thereon. Thus the harness is preassembled on the wires and the conduit pressed into the top rail groove 38. In the case of the in-rail mounted light as shown in FIG. 2, the tubular leg 64 extends generally upwardly. In the case of the out-rail mounted light as shown in FIG. 3, the tubular leg 64 extends generally downwardly, through and somewhat beyond the hole 44 before wire 48 is connected to the light. In this manner the possibility of shorts developing around the hole 44 is considerably minimized.

I claim:

1. In a two-wire system wherein one of the wires is connected at various locations to lights, a harness made of a flexible plastic comprised of a tubular conduit loosely receiving the two wires and discontinued at said various locations to provide spaced confronting conduit openings thereat, and a substantially T-shaped member having a tubular leg and a cross arm longitudinally split from end to end, said one wire being looped and extending movably through said tubular leg and said cross arm embracing said two wires at said discontinued locations of said conduit with the ends of said cross arm extending into said confronting conduit openings whereby said split is held tightly closed.

2. In a two-wire system wherein one of the wires is connected at various locations to lights, a harness made of a flexible plastic comprised of a tubular conduit loosely receiving the two wires and discontinued at said various locations to provide spaced confronting conduit openings threat, and a substantially T-shaped member having a tubular leg and a cross arm longitudinally split from end to end and having tapered ends, said one wire being looped and extending movably through said tubular leg and said cross arm embracing said two wires at said discontinued locations of said conduit with the ends of said cross arm extending into said confronting conduit openings whereby said split is held tightly closed.

3. In a trailer body having sides and longitudinal rails at the top thereof each including a longitudinal groove, lights mounted on said body adjacent the top thereof at predetermined locations, a pair of wires one of which branches and is connected to said lights, and a harness for said wires made of a flexible plastic and comprising a tubular conduit loosely receiving said pair of wires and being disposed in said top rail groove, said conduit being discontinued at said light locations to provide spaced confronting conduit openings thereat, and substantially T-shaped members each having a tubular arm through which said one wire extends in looped form to provide one of said branches and a cross arm embracing said pair of wires at said discontinued portion of said conduit, said cross arm including ends extending into said confronting conduit openings.

4. In a trailer body having sides and longitudinal rails at the top thereof each including a longitudinal groove, lights mounted on said body adjacent the top thereof at predetermined locations, a pair of wires one of which branches and is connected to said lights, and a harness for said wires made of a flexible plastic and comprising a tubular conduit loosely receiving said pair of wires and being disposed in said top rail groove, said conduit being discontinued at said light locations to provide spaced confronting conduit openings thereat, and substantially T-shaped members each having a tubular arm through which said one wire extends in looped form to provide one of said branches and a longitudinally split cross arm embracing said pair of wires at said discontinued portion of said conduit, said cross arm including ends extending into said confronting conduit openings whereby said split is held tightly closed.

5. In a trailer body having sides and longitudinal rails at the top thereof each including a longitudinal groove, lights mounted on said body adjacent the top thereof at predetermined locations, a pair of wires one of which branches and is connected to said lights, and a harness for said wires made of a flexible plastic and comprising a tubular conduit loosely receiving said pair of wires and being disposed in said top rail grove, said conduit being discontinued at said light locations to provide spaced confronting conduit openings thereat, and substantially T-shaped members each having a tubular arm through which said one wire extends in looped form to provide one of said branches, and a longitudinally split cross arm embracing said pair of wires at said discontinued portion of said conduit, said cross arm including tapered ends extending into said confronting conduit openings whereby said split is held tightly closed.

6. In a trailer body having sides and longitudinal rails at the top thereof each including a longitudinal side opening channel and a longitudinal groove opening thereinto, lights mounted in said channel at predetermined locations, a pair of wires one of which branches and is connected to said lights and a harnesss for said wires made of a flexible plastic and comprising a tubular conduit loosely receiving said pair of wires and being disposed in said top rail groove, said conduit being discontinued at said light locations to provide spaced confronting conduit openings thereat and substantially T-shaped members each having a tubular arm through which said one wire extends in looped form to provide one of said branches, and a longitudinally split cross arm embracing said pair of wires at said discontinued portion of said conduit, said cross arm including ends extending into said confronting conduit openings whereby said split is held tightly closed.

7. In a trailer body having sides and longitudinal top rails at the top thereof each including a horizontal flange with a longitudinal groove therein open on one side thereof and holes provided through the opposite side of said flange communicative with said groove and at predetermined locations, lights mounted on said body beneath said top rail flange at said predetermined locations, a pair of wires one of which branches and is connected to said lights, and a harness for said wires made of a flexible plastic and comprising a tubular conduit loosely receiving said pair of wires and being disposed in said top rail groove, said conduit being discontinued at said light locations to provide spaced confronting conduit openings thereat, and substantially T-shaped members each having a tubular arm receiving said one wire in looped form to provide one of said branches, said tubular arm extending through said hole provided in said top rail flange, and a longitudinal split cross arm embracing said pair of wires at said discontinued portion of said conduit, said cross arm including ends extending into said confronting conduit openings whereby said split is held tightly closed.

8. In a two-wire system wherein one of the wires is connected at various locations to lights, a harness made of a flexible plastic comprised of a tubular conduit loosely receiving the two wires and discontinued at said various locations to provide spaced confronting conduit openings thereat, and a substantially T-shaped member having a tubular leg and a cross arm longitudinally split from end to end, said one wire being looped and extending movably through said tubular leg, a coupling member connected to the looped end of said one wire whose periphery extends beyond the diameter of said leg, and said cross arm embracing said two wires at said discontinued locations of said conduit with the ends of said cross arm extending into said confronting conduit openings whereby said split is held tightly closed.

References Cited by the Examiner

UNITED STATES PATENTS

| | | | |
|---|---|---|---|
| 2,098,581 | 11/37 | Jones | 174—84 X |
| 2,933,550 | 4/60 | Cole et al. | 174—72 X |

NORTON ANSHER, *Primary Examiner.*